US007149249B2

(12) United States Patent
Jawerth et al.

(10) Patent No.: US 7,149,249 B2
(45) Date of Patent: Dec. 12, 2006

(54) COLOR VIDEO CODEC METHOD AND SYSTEM

(75) Inventors: Bjorn Jawerth, Morrisville, NC (US); Henrik Storm, Molndal (SE); Johan Råde, Cary, NC (US)

(73) Assignee: Summus, Inc., Raleigh, NC (US)

( * ) Notice: Subject to any disclaimer, the term of this patent is extended or adjusted under 35 U.S.C. 154(b) by 302 days.

(21) Appl. No.: 10/141,100

(22) Filed: May 7, 2002

(65) Prior Publication Data

US 2002/0186770 A1 Dec. 12, 2002

Related U.S. Application Data

(60) Provisional application No. 60/289,342, filed on May 7, 2001, provisional application No. 60/289,340, filed on May 7, 2001, provisional application No. 60/289,190, filed on May 7, 2001, provisional application No. 60/289,189, filed on May 7, 2001, provisional application No. 60/289,086, filed on May 7, 2001, provisional application No. 60/289,085, filed on May 7, 2001.

(51) Int. Cl.
*H04B 1/66* (2006.01)

(52) U.S. Cl. ............................ 375/240.13; 375/240.12; 375/240.25; 375/240.03; 375/240.21; 375/240.26; 382/233; 382/238; 382/235; 382/236; 382/251; 348/34

(58) Field of Classification Search ............ 375/240.13, 375/240.12, 240.25, 240.03, 240.21, 240.26, 375/240.24, 240.23; 382/233, 238, 235, 382/236, 251, 239, 245; 348/34
See application file for complete search history.

(56) References Cited

U.S. PATENT DOCUMENTS

| 5,301,032 | A |   | 4/1994  | Hong et al. |
|-----------|---|---|---------|-------------|
| 5,317,397 | A | * | 5/1994  | Odaka et al. ............ 375/240.15 |
| 5,703,697 | A | * | 12/1997 | Normile ...................... 382/248 |
| 5,740,278 | A |   | 4/1998  | Berger et al. |
| 5,758,092 | A | * | 5/1998  | Agarwal ..................... 709/247 |
| 5,854,858 | A |   | 12/1998 | Girod et al. |

(Continued)

FOREIGN PATENT DOCUMENTS

| EP | 1187481 A2 | 3/2002 |
|----|------------|--------|
| EP | 1187485 A1 | 3/2002 |

OTHER PUBLICATIONS

Müller, E. et al. (1998). "Scalable Wavelet-based Coding of Color Images," *Proc. Of APEIE '98* 10:29-35.

*Primary Examiner*—Shawn S. An
(74) *Attorney, Agent, or Firm*—Morrison & Foerster LLP

(57) ABSTRACT

In one aspect of a preferred embodiment, the present invention comprises a system for video compression comprising a video preprocessor; a predictor configured to receive video data from the preprocessor; and an encoder configured to communicate with the predictor. Preferably, the preprocessor comprises a colorspace converter, a frame activity detector, and a subsampler, the predictor comprises a frame differencer and a reference frame handler, and the encoder comprises an error image encoder and an image adder. In another aspect, the invention comprises a system for video decompression comprising a predictor and a decoder configured to communicate with the predictor. Preferably, the predictor comprises a reference frame handler and wherein said decoder comprises an error image decoder and a colorspace converter.

2 Claims, 15 Drawing Sheets
(3 of 15 Drawing Sheet(s) Filed in Color)

U.S. PATENT DOCUMENTS

| | | | |
|---|---|---|---|
| 5,878,166 A | * | 3/1999 | Legall .................. 382/232 |
| 5,973,626 A | | 10/1999 | Berger et al. |
| 6,031,937 A | | 2/2000 | Graffagnino |
| 6,157,740 A | * | 12/2000 | Buerkle et al. ............ 382/233 |
| 6,353,634 B1 | | 3/2002 | Houlberg |
| 6,928,648 B1 | * | 8/2005 | Wong et al. ................ 719/328 |

* cited by examiner $$Y = \begin{bmatrix} y_{00} & y_{01} & y_{02} & y_{03} & y_{04} & y_{05} & y_{06} & y_{07} \\ y_{10} & y_{11} & y_{12} & y_{13} & y_{14} & y_{15} & y_{16} & y_{17} \\ y_{20} & y_{21} & y_{22} & y_{23} & y_{24} & y_{25} & y_{26} & y_{27} \\ y_{30} & y_{31} & y_{32} & y_{33} & y_{34} & y_{35} & y_{36} & y_{37} \\ y_{40} & y_{41} & y_{42} & y_{43} & y_{44} & y_{45} & y_{46} & y_{47} \\ y_{50} & y_{51} & y_{52} & y_{53} & y_{54} & y_{55} & y_{56} & y_{57} \\ y_{60} & y_{61} & y_{62} & y_{63} & y_{64} & y_{65} & y_{66} & y_{67} \\ y_{70} & y_{71} & y_{72} & y_{73} & y_{74} & y_{75} & y_{76} & y_{77} \end{bmatrix}$$

$$Y'_{evens} = \frac{1}{2} \begin{bmatrix} (y_{00}+y_{01}) & (y_{02}+y_{03}) & (y_{04}+y_{05}) & (y_{06}+y_{07}) \\ (y_{20}+y_{21}) & (y_{22}+y_{23}) & (y_{24}+y_{25}) & (y_{26}+y_{27}) \\ (y_{40}+y_{41}) & (y_{42}+y_{43}) & (y_{44}+y_{45}) & (y_{46}+y_{47}) \\ (y_{60}+y_{61}) & (y_{62}+y_{63}) & (y_{64}+y_{65}) & (y_{66}+y_{67}) \end{bmatrix}$$

$$Y'_{odds} = \frac{1}{2} \begin{bmatrix} (y_{10}+y_{11}) & (y_{12}+y_{13}) & (y_{14}+y_{15}) & (y_{16}+y_{17}) \\ (y_{30}+y_{31}) & (y_{32}+y_{33}) & (y_{34}+y_{35}) & (y_{36}+y_{37}) \\ (y_{50}+y_{51}) & (y_{52}+y_{53}) & (y_{54}+y_{55}) & (y_{56}+y_{57}) \\ (y_{70}+y_{71}) & (y_{72}+y_{73}) & (y_{74}+y_{75}) & (y_{76}+y_{77}) \end{bmatrix}$$

FIG. 10

$$S' = \frac{1}{16}\begin{bmatrix} \sum_{i,j}\begin{pmatrix} s_{00} & s_{01} & s_{02} & s_{03} \\ s_{10} & s_{11} & s_{12} & s_{13} \\ s_{20} & s_{21} & s_{22} & s_{23} \\ s_{30} & s_{31} & s_{32} & s_{33} \end{pmatrix} & \sum_{i,j}\begin{pmatrix} s_{40} & s_{41} & s_{42} & s_{43} \\ s_{50} & s_{51} & s_{52} & s_{53} \\ s_{60} & s_{61} & s_{62} & s_{63} \\ s_{70} & s_{71} & s_{72} & s_{73} \end{pmatrix} \\ \sum_{i,j}\begin{pmatrix} s_{04} & s_{05} & s_{06} & s_{07} \\ s_{14} & s_{15} & s_{16} & s_{17} \\ s_{24} & s_{25} & s_{26} & s_{27} \\ s_{34} & s_{35} & s_{36} & s_{37} \end{pmatrix} & \sum_{i,j}\begin{pmatrix} s_{44} & s_{45} & s_{46} & s_{47} \\ s_{54} & s_{55} & s_{56} & s_{57} \\ s_{64} & s_{65} & s_{66} & s_{67} \\ s_{74} & s_{75} & s_{76} & s_{77} \end{pmatrix} \end{bmatrix}$$

$$S = \begin{bmatrix} s_{00} & s_{01} & s_{02} & s_{03} & s_{04} & s_{05} & s_{06} & s_{07} \\ s_{10} & s_{11} & s_{12} & s_{13} & s_{14} & s_{15} & s_{16} & s_{17} \\ s_{20} & s_{21} & s_{22} & s_{23} & s_{24} & s_{25} & s_{26} & s_{27} \\ s_{30} & s_{31} & s_{32} & s_{33} & s_{34} & s_{35} & s_{36} & s_{37} \\ s_{40} & s_{41} & s_{42} & s_{43} & s_{44} & s_{45} & s_{46} & s_{47} \\ s_{50} & s_{51} & s_{52} & s_{53} & s_{54} & s_{55} & s_{56} & s_{57} \\ s_{60} & s_{61} & s_{62} & s_{63} & s_{64} & s_{65} & s_{66} & s_{67} \\ s_{70} & s_{71} & s_{72} & s_{73} & s_{74} & s_{75} & s_{76} & s_{77} \end{bmatrix}$$

FIG. 11

COLOR VIDEO CODEC METHOD AND SYSTEM

CROSS-REFERENCE TO RELATED APPLICATIONS

This application claims priority to the following U.S. provisional patent applications: Nos. 60/289,340; 60/289,342; 60/289,086; 60/289,085; 60/289,189; and 60/289,190, all filed May 7, 2001, and all entitled "Method and System for Data Compression/Decompression." The contents of each provisional application are incorporated herein in their entirety by reference.

BACKGROUND

Data compression methods are used to reduce the amount of data necessary to represent information. Compression is often used when data storage space, transmission bandwidth, or transmitter/receiver data rate is limited. Data is compressed to a smaller size for storage or transmission and then decompressed back to original size when needed.

Compression schemes can be classified as either "lossless" or "lossy." In a lossless compression scheme, the data that is reconstructed at decompression is an exact match to the original data—no information is lost. In a lossy compression scheme, some information may be lost in the compression process. The goal of a lossy compression scheme is to choose the discarded information wisely, so that the data reconstructed at decompression is as close as possible to the original data, or at least so that the difference between the original and the reconstructed data is acceptable.

Video signals are a common type of data for use in compression systems. Raw video data tends to be large, so that working with raw, uncompressed video would require large amounts of storage space or transmission bandwidth. However, characteristics of typical video allow fairly aggressive compression. For instance, there is high correlation between adjacent pixels in a single video frame (the set of all picture elements that represent one complete image), since objects in video tend to be of fairly uniform color and texture. In addition, there is high correlation between pixels in the same position in adjacent video frames, since motion in video usually occurs slowly in relation to the video frame rate. These high correlations mean that video signals contain a large amount of redundant information, and these redundancies are typically exploited by compression schemes for video. In addition, most video applications do not require lossless compression—the quality constraint is simply that a human viewer perceive little or no degradation in quality after compression and decompression. The limitations and strengths of human visual perception can be taken into account when designing a lossy video compression scheme—information not perceptually significant is discarded first.

Compression schemes also can be classified as either "symmetric" or "asymmetric." In a symmetric scheme, the compression and decompression processes are roughly equal in computational complexity. A symmetric scheme is appropriate when similar processing constraints are present at both compression and decompression points, such as in video-conferencing applications where both compression and decompression must be done in real-time. An asymmetric scheme is used when compression and decompression have different complexity constraints. Typically, the constraint on the decompression end is greater, so computations are performed by the compressor in order to lessen the computational burden on the decompressor. An asymmetric scheme is usually used for video that will be captured once and then distributed many times, such as video clips stored and made available to many users on a computer network.

Further information on typical video compression systems can be found in ITU-T Recommendation H.263 (approved February 1998); The Data Compression Book, 2nd Edition, by Mark Nelson and Jean-loup Gailly (1995); and Video Demystified, 3rd Edition, by Keith Jack (2001) (see especially chapter 3, on color spaces, the contents of which are incorporated herein by reference for all purposes).

FIG. 1 is a diagram of a typical asymmetric video compression system. Many existing video compression systems fit within this basic framework. The system consists of five main blocks—preprocessing, motion estimation, transform, quantization, and encoding—along with a feedback loop used to create decompressor reference data.

The purpose of the preprocessing block is to prepare the video data for compression. Preprocessing functions typically convert the input video data into a format that allows for easier or more aggressive compression.

One commonly used step of video preprocessing is subsampling. When video is subsampled, the size of the video frames (the number of pixels) is reduced. Subsampling is a simple way to create gains in video compression efficiency—by reducing the video frame size by half in each dimension, a 4:1 compression ratio has already been achieved. However, subsampling can result in distracting artifacts when the video is restored to full resolution after decompression.

Another commonly used step of video preprocessing is colorspace conversion. Existing raw video data is usually stored in an RGB color format (discussed below in more detail), since RGB is a convenient format for many existing displays. However, the RGB color format is not well suited to efficient compression, since the visually important video information is evenly distributed over the red, green, and blue color channels. For this reason, many video compression schemes include conversion to a different colorspace such as YUV (also discussed below). The YUV color format also contains three channels, but most of the visually important information is found in the Y channel, which contains pixel intensity information. The U and V channels contain all of the color information for the video data. Since the human eye is less sensitive to color errors than to intensity errors in typical video, the U and V channels can be compressed much more aggressively than the Y channel, with little degradation in decompressed video quality. For instance, the Y channel can be kept at full resolution while the U and V channels are subsampled by a factor of 16. This results in a similar compression ratio to the RGB subsampling by 4 (3.75:1 versus 4:1) but the quality of the resulting video is much higher because the most visually important information has been preserved.

The preprocessing block may also include other miscellaneous functions that depend on the specific design of the video compressor, such as object identification and denoising.

Prediction is used to exploit the redundancy between adjacent frames in typical video signals. Most asymmetric video compression systems contain a feedback loop including a "dummy" decompressor that mimics the state of the actual decompressor. The feedback loop provides the prediction block with copies of the previous video frame(s), and the prediction block then uses motion estimation to make a guess at what the next frame will look like. Then, rather than working with actual pixel values, the compressor will perform the remaining computations on the error between the actual frame and the predicted frame. Error values are generally smaller and sparser than pixel values, so the use of prediction reduces the amount of information that must be transmitted to the decompressor.

In addition to providing error data for further compression, the prediction block will also provide a parametric description of the estimated motion, which will be used at the decompressor to create the correct predicted frame.

Most video compression schemes include a mathematical transformation of the video data. Like the colorspace transform described above, the purpose of the mathematical transform is to organize the video data into a form more suitable for effective compression.

Two common transforms in video compression are the discrete cosine transform (DCT) and the wavelet transform. Each of these transforms organizes the video data into an "average" component and a "detail" component. The average component contains basic shape information for video frames. The detail component contains edge information, which sharpens and clarifies the video frames.

Organizing the video data into average and detail components is beneficial for compression because this organization isolates most of the energy in the video frame into a few values. For natural video, the average component tends to contain only a few values that are very important to the accurate reconstruction of the video at the output. In contrast, the detail component will contain many values that have much less impact on the video quality. The few values in the average component can be transmitted with high accuracy, while the many values in the detail component can be compressed much more aggressively.

While most transform techniques are applied to the error data as shown in FIG. 1, some systems apply the transform to incoming data and then perform motion estimation and all subsequent operations in the transform domain.

In most video compression schemes, quantization is used to increase data compression. In the quantization block, the accuracy of the video data is decreased by reducing the number of bits used to store the values. Effective use of data quantization is enhanced by the reorganization of the video data that was accomplished in the preprocessing and transform blocks; the data that is less visually important can be quantized more aggressively. Data quantization is the source of most of the information loss in a typical lossy video compression system.

The entropy encoding block in a video compressor further compresses the video data using lossless compression schemes. Common lossless compression methods for video applications are run-length encoding, Huffman encoding, arithmetic coding, or a combination of these.

FIG. 2 shows a typical decompressor corresponding to the compressor in FIG. 1. The decompressor simply reverses the operations of the compressor. First, the entropy coding, quantization, and transform are all reversed to recover the motion and error data. The motion data is applied to the previous frame, producing a prediction of the upcoming frame. Then, the error data is applied to the predicted frame to produce the output video frame. Finally, any post-processing tasks such as colorspace conversion and upsampling are completed to convert the video into the proper format for output or display.

The primary disadvantage of the prior art approach for wireless applications is its computational complexity. Even when an asymmetrical design is used, the decompressor is typically too heavy to produce acceptable video quality in real time on wireless devices that are heavily constrained in processing power and battery life.

There is thus a need for a compression/decompression method that is computationally light enough to run even on low-performance mobile devices. Prior art video compression designs are based on the assumption that the compression gain and bandwidth savings obtained from complex computations such as mathematical transform and motion estimation are worth the computational cost. However, in many wireless environments this assumption does not hold true, since the cost of reversing the transform and applying the motion data, even in an asymmetric system, makes the decompressor too heavy.

Prior art systems often attempt to produce decompressed video that is as close as possible to the original source video. However, showing well-reconstructed video on a limited display means that much of the data that is retained is not visually useful, since limitations of the display create more visual information loss than does the compression/decompression.

SUMMARY

A preferred embodiment of the present invention eliminates computationally expensive operations to create a decompressor that is extremely light. The invention makes up for removal of transform and motion estimation by exploiting the limited display capabilities of many wireless devices. In addition to an asymmetric computational approach, the invention also takes into account asymmetric display capabilities, allowing compression to be gained through aggressive quantization and subsampling. This approach results in a decompressor that is both much simpler and more effective than those in the prior art, allowing efficient computational optimizations that make the decompressor light enough to run on a low-performance wireless device.

In one aspect of a preferred embodiment, the present invention comprises a system for video compression comprising a video preprocessor; a predictor configured to receive video data from the preprocessor; and an encoder configured to communicate with the predictor. Preferably, the preprocessor comprises a colorspace converter, a frame activity detector, and a subsampler, the predictor comprises a frame differencer and a reference frame handler, and the encoder comprises an error image encoder and an image adder. In another aspect, the invention comprises a system for video decompression comprising a predictor and a decoder configured to communicate with the predictor. Preferably, the predictor comprises a reference frame handler and wherein said decoder comprises an error image decoder and a colorspace converter.

In another aspect, the invention comprises a method for video compression, comprising receiving color video data represented in a first colorspace representation, converting the received color video data to a second colorspace representation, identifying activity between consecutive frames of the converted color video data, subsampling the converted color video data, calculating error image data based on the subsampled and converted color video data and on the identified frame activity, encoding the error image data, and transmitting the encoded error image data to a device capable of displaying color video data, wherein the step of identifying activity is preferably performed before the step of subsampling.

In another aspect, the invention comprises a method for video decompression comprising receiving encoded color video error image data, decoding the data, combining the decoded data with previously received data to construct video frame data in a first colorspace representation, converting the color video frame data to a second colorspace representation with one pass through the data, and displaying the color video frame data, wherein the step of converting comprises upsampling and dithering. Preferably, the step of converting is performed using look-up tables.

In a further aspect, the invention comprises a method for compressing and decompressing color video data, comprising receiving color video data represented in a first colorspace representation and with a first pixel depth; converting the color video data to a second colorspace representation with a second pixel depth; compressing the converted data; and decompressing the compressed converted data, wherein the step of decompressing comprises converting the data to a third colorspace representation with a third pixel depth.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

FIG. 10 illustrates preferred Y component subsampling.

FIG. 11 illustrates preferred S component subsampling.

DETAILED DESCRIPTION OF THE PREFERRED EMBODIMENT

A preferred embodiment of the present invention comprises a color video codec. The efficient methods of a preferred embodiment of the codec allow color video at 128×117 pixel size and 10 fps to be decoded using less than 125 kB of combined program and data memory and 0.8–2.4 MIPS (depending on the video sequence) on an 8-bit color display. The codec generally achieves 30–50 times compression, but for some simple sequences may achieve 100 times compression or greater. The peak signal-to-noise ratio (PSNR), comparing the 24-bit input video to the 8-bit output video, is about 20 dB on the Y-channel. Most of this loss in quality comes from the color quantization; a color quantization alone with no other compression applied gives similar PSNR results.

Compressor 100

Figure 1:
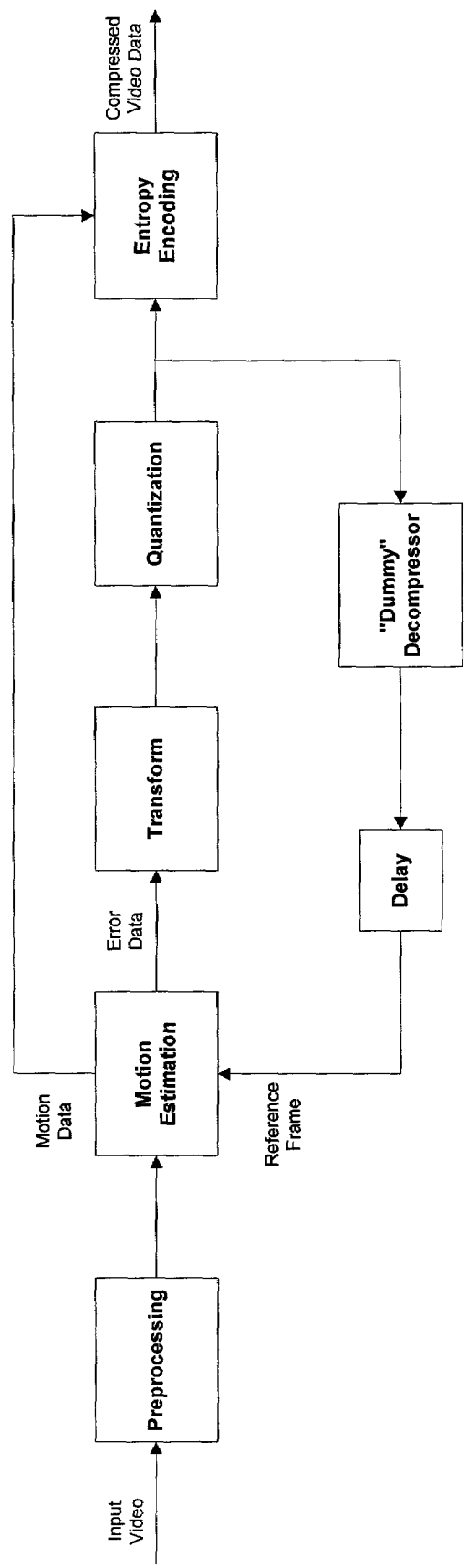
FIGS. 1 and 2 are block diagrams of a typical prior art asymmetric video compression system.
Figure 2:
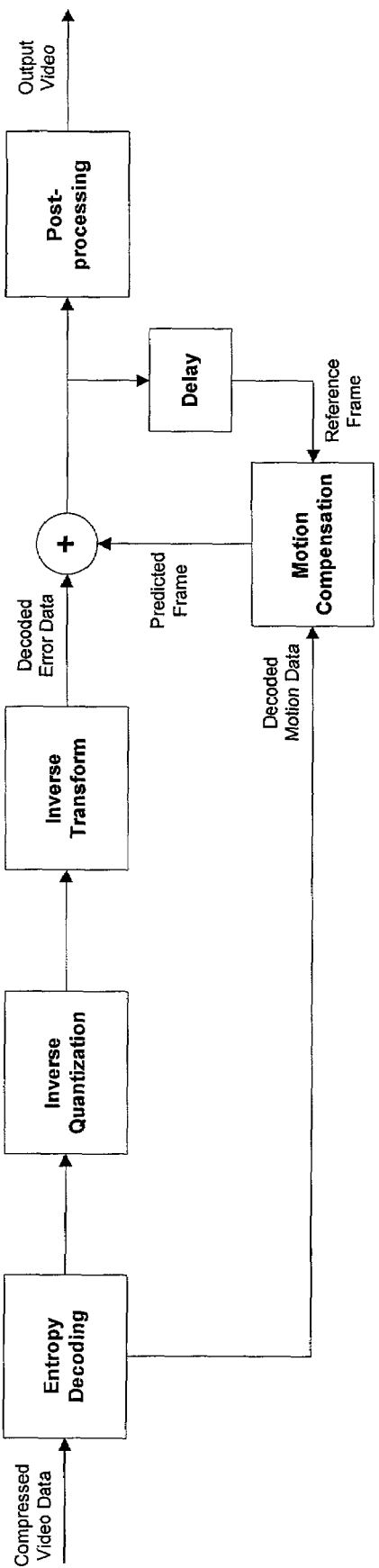
Figure 3:
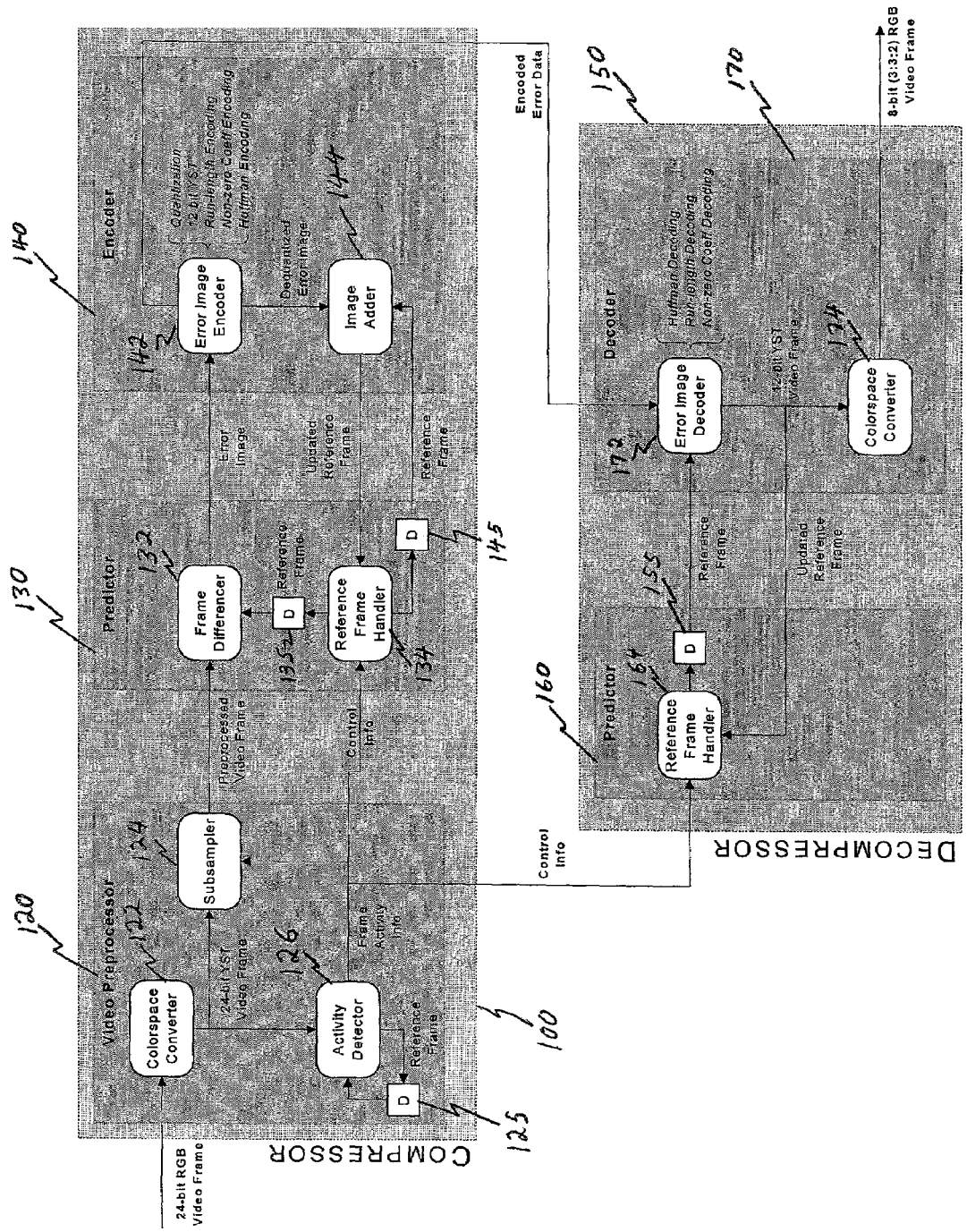
FIG. 3 is a block diagram of components of a preferred embodiment of the invention.

In a preferred embodiment, a video compressor 100 comprises three modules (see FIG. 3). The first module, a Video Preprocessor 120, prepares the video for compression by converting to a more compressible colorspace, detecting the amount of activity in the video, and subsampling. The second module, a Predictor 130, computes frame differencing and maintains prediction reference frames. The third module, an Encoder 140, encodes the error image to be transmitted in compressed form. The following sections detail the operation of the three compressor modules. The "D" blocks 125, 135, 145, and 155 indicate time delays. The delays may be one or two frame periods, depending on activity level, as discussed below.

Video Preprocessor 120

Color Space Converter 122—The video compressor 100 preferably takes 24-bit RGB video input. Colorspace Converter 122 convert the input video from the input RGB colorspace to a YST colorspace. YST is a novel color format preferably used in the present invention. Conversion from RGB to YST concentrates the most important information in the video sequence into the Y component of the new colorspace. The S and T components contain color information that can be more aggressively subsampled to obtain better compression. The YST colorspace is described in greater detail below.

Frame Activity Detector 126—A frame activity detector 126 identifies the amount of change between the current frame and the previous frame, so that a compression method can be chosen based on the amount of frame activity. The amount of frame-to-frame change is commonly known as the "error value," and it is computed by summing the pixel-by-pixel differences between the Y-components of the two frames, as shown in the formula below:

$$ErrorValue = \sum_{i,j} |Y_{curr}(i, j) - Y_{prev}(i, j)|$$

In the formula, Y(i,j) is the pixel in the j-th column of the i-th row of the matrix Y containing the Y-component data for a single video frame.

Figure 4:
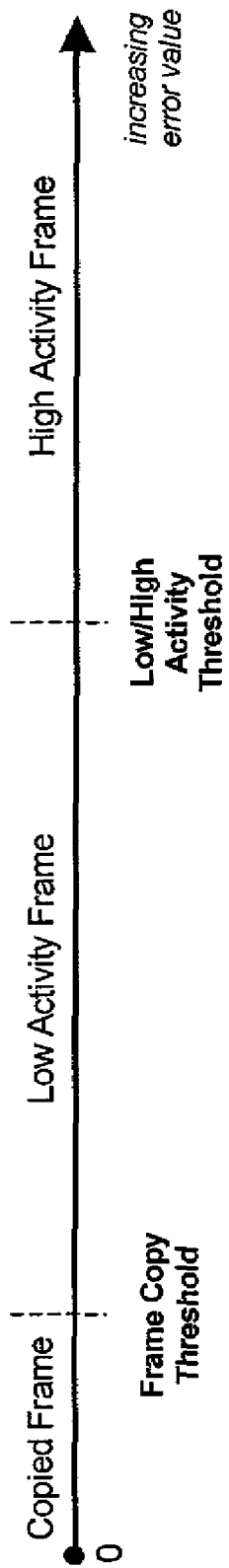
FIG. 4 depicts activity thresholds used in a preferred embodiment.

Each frame is classified on the scale depicted in FIG. 4 according to its error value. An error value of 0 indicates that the current frame is identical to the previous frame, so that rather than compressing and sending the current frame, the decompressor is instructed to redisplay the previous frame. If the error value indicates that the change between the current and previous frames is so small as to be unnoticeable, then a frame copy is also triggered. In the case of a frame copy, none of the further computations described are executed—the compressor simply sends a flag to the decompressor, and no video data is transmitted. Preferably, the number of consecutive frame copies is limited to a maximum that is specified as a parameter.

For low activity frames, interlacing can be used to make the video resolution appear higher than it actually is. When the error value is small, but too large for a frame copy to be used, the current frame is identified as "low activity," and interlacing is used to improve the perceived quality of the video. Interlacing is preferably only applied to the Y video channel; the S and T channels are preferably never interlaced. For frames with a lot of activity, interlacing produces distracting artifacts in video. Therefore, if the error value is large, the current frame is identified as high activity, and interlacing is not used.

If the activity in a frame is very high, the frame is identified as a keyframe. Keyframes are typically triggered within the Frame Activity Detector 126 at scene changes in the video sequence. Keyframes can preferably also be set from outside the Frame Activity Detector 126 by triggering at regular intervals or after a certain number of consecutive non-keyframes. In prediction and encoding, keyframes are preferably treated the same as other high-activity frames, except that the reference frame is ignored (i.e., the reference frame is set to all zeros).

The thresholds identifying the boundaries between copied frames, low activity frames, and high activity frames are parameters typically determined by trial-and-error, with values selected to give the best perceived results. In a preferred embodiment, a programmer makes the trial-and-error determination and the selected values are hard-coded into the compressor. In an alternate embodiment, the values are changed on-the-fly during video compression. The same is true of the maximum frame-copy value.

A preferred feedback loop for maintaining reference frames in Frame Activity Detector 126 uses dual buffers that allow a delay of either one or two frame periods. When interlacing is used, even-row frames are compared with the previous even-row frame, and odd-row frames are compared with the previous odd-row frame. Since even- and odd-row frames alternate, this means that two frames worth of reference data is maintained. For high activity frames that do not use interlacing, only the immediately previous frame is used. Since interlacing is only used on the Y channel, two previous frames of Y data are maintained, but only one previous frame of S and T data is maintained.

Subsampler 124—To save processing time and transmission bandwidth, each frame is preferably subsampled by subsampler 124 before being compressed. The subsampled frame is enlarged back to its original size during the color conversion/dithering/upsampling process (during a table lookup) in the decompressor 150. The Y component is preferably subsampled by a factor of 2 in each dimension, and the S and T components are preferably subsampled by a factor of 4 in each direction.

The Y component subsampling is preferably computed by applying a [½ ½] averaging filter across every other row of the Y component matrix. For high activity frames, the even rows are preferably used. For low activity frames, the rows used preferably alternate—if the even rows were used in the last frame, then the odd rows are chosen for this frame, and vice versa. Note that this subsampling is not a pixel-by-pixel two-dimensional computation; regardless of whether interlacing is used, half of the rows in the full-sized frame will be ignored. An example is shown in FIG. 10, where Y is the full-size 8×8 pixel Y component and $Y'_{evens}$ and $Y'_{odds}$ show the subsampled Y components for the even and odd row cases.

The S and T component subsampling is preferably computed by segmenting the S and T component matrices into 4×4 pixel blocks and averaging the 16 pixels in each block. The S and T components are subsampled in the same way regardless of whether the frame is interlaced or not. An example is shown in FIG. 11, where S is the full-size 8×8 pixel S component, and S' is the subsampled 2×2 S component. The T component is treated identically.

Predictor 130 Since motion estimation or compensation preferably are not used, the predictor module operates in a straightforward manner.

Reference Frame Handler 134 The two previous frames of Y channel data and one previous frame of S and T channel data are stored as reference frames for computing an error image. Two frames are needed for the Y channel because interlacing requires one frame for the even rows and one for the odd rows. When interlacing is not used, only the immediately preceding reference frame is needed. Note that these reference frames are preferably received from Image Adder 144, and have been quantized and dequantized (by Error Image Encoder 142, described below) to mimic, and preserve synchronization with, the state of the decompressor. They are not the same as the reference frames used in the Frame Activity Detector 126. The Reference Frame Handler 134 sends a copy of the reference frame to the Frame Differencer 132, for calculation of the error image, and sends a copy to Image Adder 144, to be added to the subsequently dequantized error image and returned as the next (i.e., updated) reference frame. Depending on whether interlace mode is used, the appropriate reference frame is sent to Frame Differencer 132. (The one containing even, or odd rows.)

Frame Differencer 132 Prediction error (i.e., the error image) is preferably found by computing the difference between the current frame and the predicted frame, although other error image calculation methods could be used. The predicted frame is preferably a reference frame stored by Reference Frame Handler 134—typically, a quantized and dequantized version of the previous frame.

Encoder 140

Error Image Encoder 142 Here the error image is compressed for transmission to the decompressor. The first step is to quantize the error image. A copy of the quantized error image is dequantized and sent to Image Adder 144, to be used in reconstructing the reference frame used by Frame Differencer 132. A second copy of the quantized error image is then compressed by Error Image Encoder 142 using runlength coding or non-zero coefficient coding (depending on the keyframe flag). Finally, both the runlength-encoded data and the non-zero-coefficient encoded data are Huffman encoded, and the Huffman-encoded data are transmitted to the Decompressor 150. The input to the Error Image Encoder 142 preferably equals the current input frame, if the keyframe flag is ON, and it equals the current input frame minus the reference image, if the keyframe flag is OFF.

Figure 5:
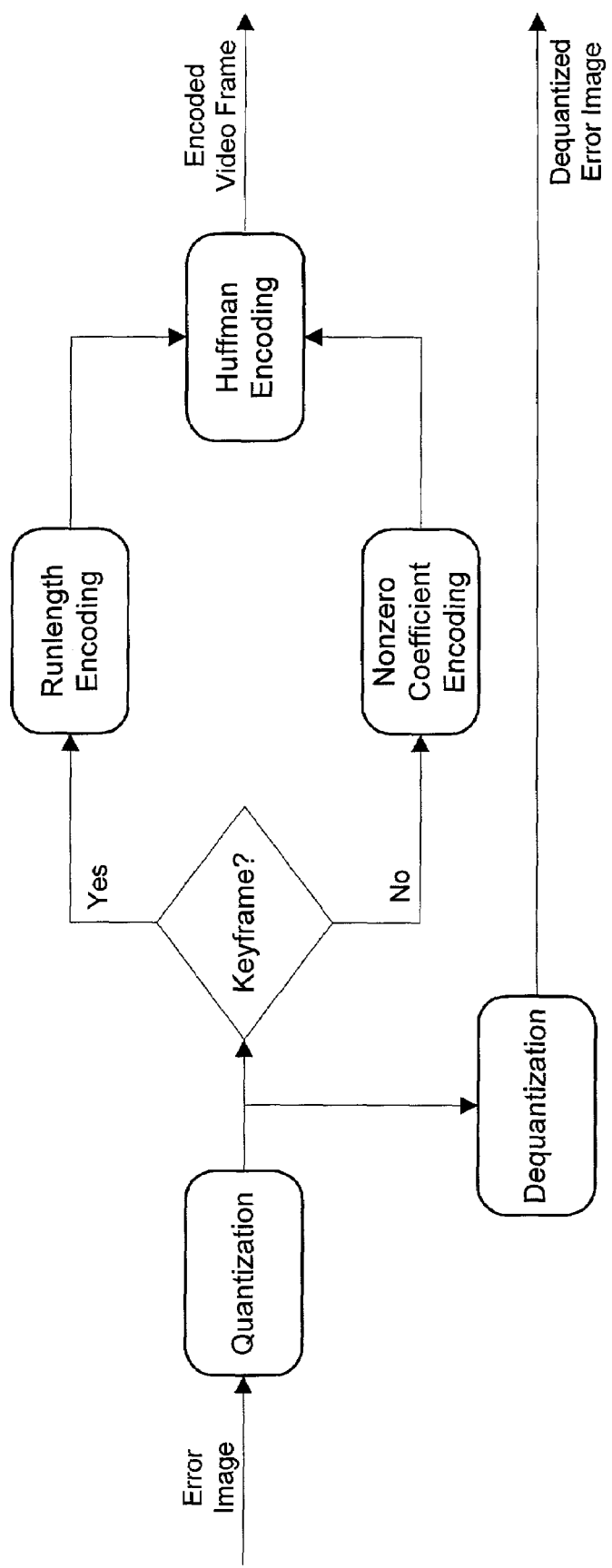
FIG. 5 depicts a preferred flow of operations in an Error Image Encoder.
Figure 6:
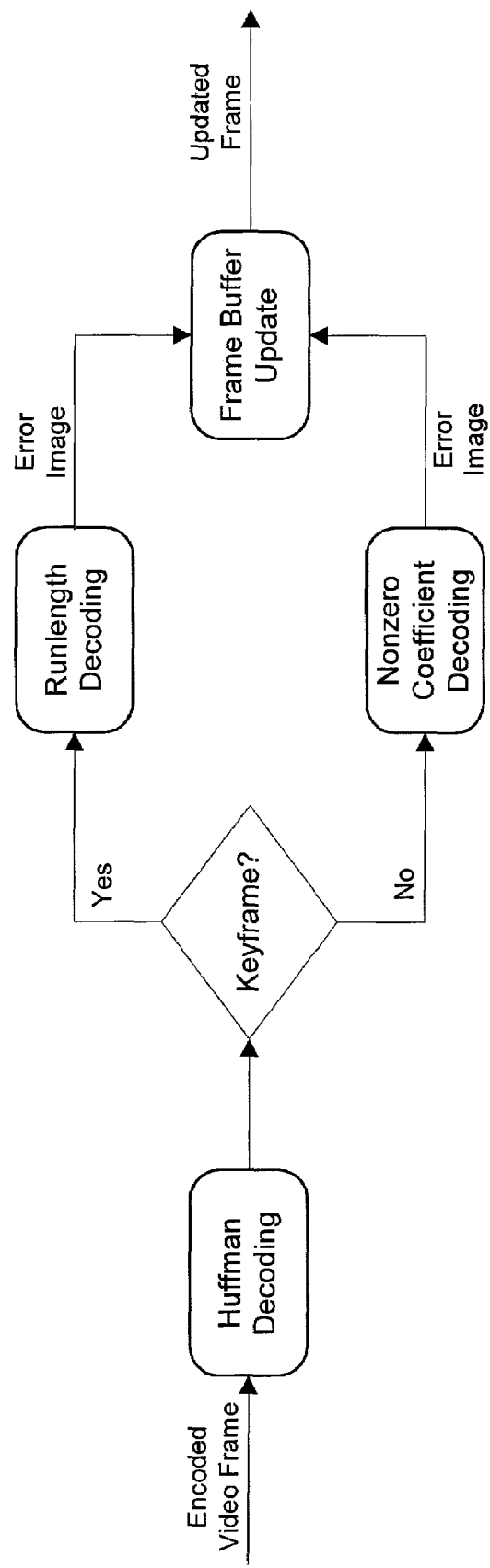
FIG. 6 depicts a preferred flow of operations in an Error Image Decoder.

The Error Image Encoder 142 and Error Image Decoder 172 preferably use variations on standard methods to losslessly compress and decompress the video error data for transmission. FIGS. 5 and 6 show preferred flow of data within the Error Image Encoder 142 and Decoder 172.

Quantization: In a preferred embodiment, the error image values are quantized to 4-bit values by truncating away all but the four most significant bits. Both keyframes and non-keyframes are quantized in the same way, although the quantized results are then encoded differently.

In Compressor 100, the quantized error image is preferably dequantized by a left bitshift to replace the bits that were truncated away in quantization. This dequantized error image is then fed back within Compressor 100 for use in reference frame maintenance. Dequantization is performed in Decompressor 150 using look-up tables.

In one embodiment, quantization is performed by 4-bit bitshifting. This provides a "uniform" quantization of the input image. However, non-uniform quantization is the preferred method for the color channels, with more narrow quantization bins around the center (value=128), and wider bins at the extreme values (0, and 255). Input images may be preprocessed by "stretching" or rescaling each pixel value according to the YST specifications. Preferably, only the 2 color channels are stretched.

Thus, in one embodiment, the quantization step comprises one stretching/scaling step plus a uniform 4-bit bitshift operation, which in effect makes it a non-uniform quantization. All non-uniformly-quantized data on the compressor side (along with the non-quantized error images, and reference images) contains these scaled, or stretched images. The Y-channel is not non-uniformly quantized, and is therefore not 'stretched. Since the dequantization of the data on the decompressor side is preferably made through a table, the non-uniform quantization is easily compensated for, without any extra computational load.

Runlength Coding of Quantized Keyframes: In keyframes, the "error image" contains the actual preprocessed video data, since the reference frame used in differencing is set to all zeros. In typical video, differences between adjacent pixels are expected to be small, suggesting that an efficient way to encode a keyframe may be to use spatial differencing.

Encoder 140 preferably scans the image in row-major order from the top left corner to the bottom right corner, computing at each position the difference between the current pixel value and the previous pixel value. (For the first pixel in the image, the "previous" value is assumed to be 0.) As long as the difference between adjacent pixels is 0, the encoder will continue to traverse across rows, keeping a runlength count of the number of zero differences. When a non-zero difference is encountered, the runlength count is recorded along with the non-zero difference value, and then the count is reset to 0.

The effect of this coding method is that the pixel values are represented as sets of runlength-difference pairs (r, d): a run of r identically valued pixels is followed by a pixel with a new value that differs from the previous value by d. Long runs of identical pixels are efficiently encoded using runlengths, and at runlength boundaries the values of d are expected to be close to zero, allowing for efficient Huffman encoding. Since pixel values in the keyframe range from 0 to 15, the difference between two adjacent pixels can range from −15 to 15. However, the difference can still be expressed in a 4-bit value, since the color differences can be treated modulo 16:−1=+15, −2=+14, etc.

The preferred decoding method for the keyframe data follows from the encoding method. The first pair (r0, d0) in the image will indicate the value of the first pixel. (Since the initial value of the "previous" pixel was assumed to be 0, a nonzero value of r0 will indicate that the first pixel value is 0, and a value r0=0 will indicate that the first pixel value is d0.) From the first pixel, the decoder iterates through the (ri, di) pairs, repeating the previous value ri−1 times and then applying the difference di to find the next value.

Non-zero Coefficient Coding of Quantized Non-Keyframes: In non-keyframes, the error image is preferably encoded using a temporal differencing approach. The error image represents the differences between corresponding pixels in the current and previous frames. In typical video, the change in most pixel positions over a single frame period is very small, so the error image is expected to be sparse—that is, mostly zeros.

The Encoder 140 preferably scans the error image in row-major order from the top left corner to the bottom right corner. As long as the current error value is 0, the encoder will continue to traverse across rows, keeping a runlength count of the number of zeros. When a nonzero error value is encountered, the runlength count is recorded along with the nonzero value, and then the count is reset to 0.

The effect of this coding method is that the error values are represented as sets of runlength-value pairs (r, v): a run of r zeros is followed by a pixel with the error value v. The long runs of zeros are efficiently encoded using runlengths, and the non-zero values are still expected be close to zero, allowing for efficient Huffman encoding. Note that, as with the spatial differencing using for keyframes, the temporal differences can be expressed in 4-bit values by treated them modulo 16.

The decoding method for the non-keyframe data follows from the encoding method. The decoder iterates through the (ri, vi) pairs, decoding ri zeros followed by a single value vi for each pair.

Huffman Coding:

The Huffman coder used in a preferred embodiment uses a fixed table containing 16 symbols. The use of a fixed table saves the statistical computations that are required by adaptive Huffman schemes, and the 16-symbol limitation keeps the table at a manageable size. Both the keyframe data and the non-keyframe data are Huffman encoded prior to transmission to Decompressor 150 using the same fixed table. The spatial and temporal differencing described above will result in difference values that are close to 0. Therefore, the fixed Huffman table is built to favor small values by assigning the shortest Huffman symbols to the smallest values.

The difference values will always fall in the range [1,15] due to the modulo 16 treatment, but the runlength values may be larger than 15. Values larger than 15 are handled within the 16-symbol Huffman table by recursively dividing by sixteen until a value less than 16 is obtained. The range [1,15] uses fifteen of the sixteen Huffman symbols, and the remaining symbol is used as a flag to indicate the encoding of a large value.

At the decoder 150, the fixed Huffman table decoding is accomplished efficiently by decoding several symbols at a time. Huffman-encoded data is always read in 8-bit segments to avoid expensive bitwise operations, and precalculated tables stored in program memory are used to decode the symbols. This is a standard Huffman decoding method.

Image Adder 144 Here the dequantized error image from the Error Image Encoder 142 is added to the predicted image (the stored reference frame, received from Reference Frame Handler 134) to construct a new reference frame. The updated reference frame is then sent to Reference Frame Handler 134.

Decompressor 150

A video decompressor of a preferred embodiment comprises two major parts: a Predictor 160 and a Decoder 170. The Predictor 160 comprises a Reference Frame Handler 164 that maintains reference image information to be combined with the received and decoded error image data to create video frames. The Decoder 170 comprises an Error Image Decoder 172 that interprets the error data and applies the decompression methods required to decode the video, and a Colorspace Converter 174 that performs upsampling, de-interlacing (if necessary), and intelligent 12-to-8 bit color conversion.

Predictor 160

Like the Encoder 140, the Predictor 160 maintains two reference frames based on previously decoded video, stored by Reference Frame Handler 164. For interlaced data, the most recent even-row or odd-row frame, as appropriate, is used as the reference frame. In the interlaced case, the reference frame will be delayed by two frame periods, since even- and odd-row frames alternate. For non-interlaced data, the immediately preceding frame is used.

Decoder 170

Error Image Decoder 172 Here the compressed error image data is received and decoded. If a frame copy flag is received, then the previous frame is redisplayed and the error image decoder waits for the next set of frame data. For low or high activity frames, the Huffman, runlength, and non-zero coefficient coding are all reversed to recover the original error values. The decoded coefficient errors are then preferably applied directly to the reference image, thus saving the computation and memory resources that would be required to store, retrieve, and apply the error data as a separate step. Note that unlike in the compressor 100, the error and reference images are not dequantized at this point. That is, after Huffman, runlength, and non-zero-coefficient decoding occurs, the (still-quantized) error image is added to the reference frame stored by Reference Frame Handler 164 to create a video frame. One copy of that frame is sent to Reference Frame Handler 164, to be stored as the next reference frame. The other copy is then dequantized (using one or more look-up tables) and sent to Colorspace Converter 174.

Fixed Huffman table decoding is accomplished efficiently by decoding several symbols at a time. Huffman-encoded data is preferably read in 8-bit segments to avoid expensive bitwise operations, and precalculated tables stored in program memory are used to decode the symbols. This is a standard Huffman decoding method. See, e.g., Choueka, Y., S. T. Klein, and Y. Perl, *Efficient Variants of Huffman Codes in High Level Languages,* Proceedings of the $8^{th}$ Annual International ACM SIGIR Conference on Research and Development in Information Retrieval, June 1985, pp. 122–130.

Colorspace Converter 174 The colorspace converter 174 receives the quantized, subsampled YST representation of the output video. The converter 174 then performs upsampling, de-interlacing (if necessary), and intelligent 12-to-8 bit color conversion, all in a single pass through the image. The upsampling and the color conversion through the table look-up implement the dithering process The combination of all these tasks into a single pass makes this process very efficient. The intelligent color conversion performs a checkerboard mixing of colors to simulate color shades that are not realizable by an 8-bit color display. This is described in more detail below.

Description of Preferred Data Flow

In a preferred embodiment, video data is processed by the system shown in FIG. 3 and described herein as follows.

Figure 7:
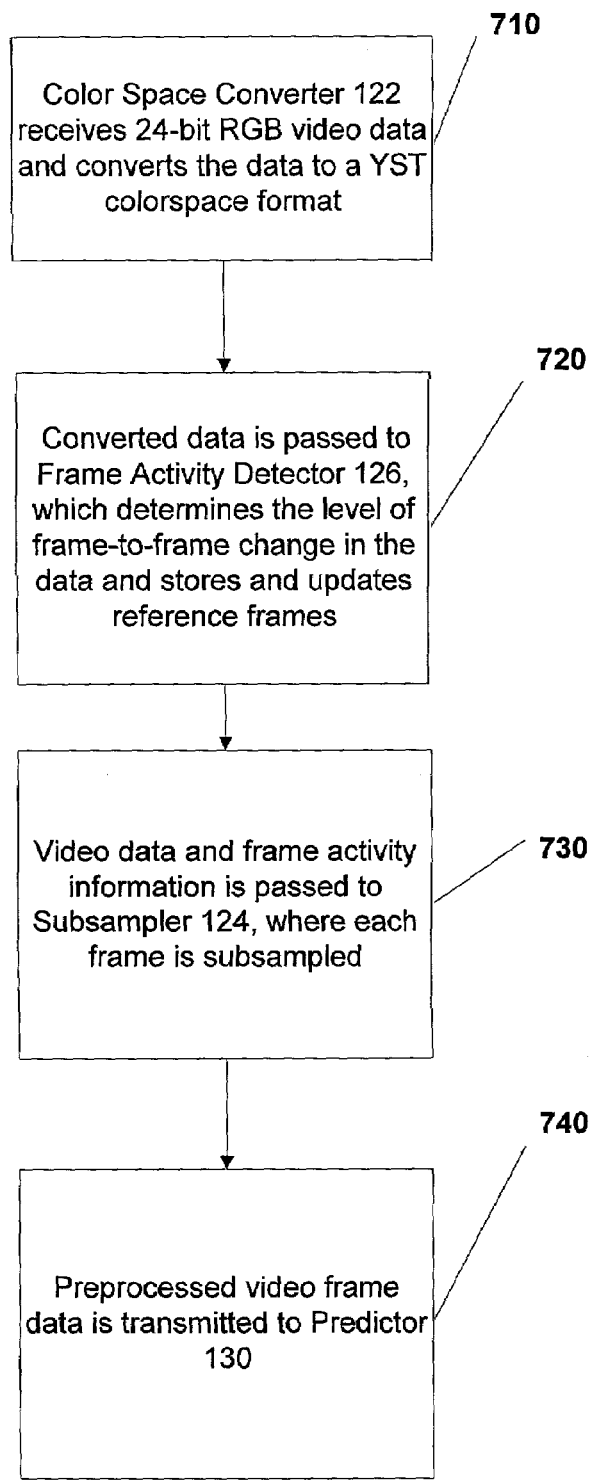
FIG. 7 depicts preferred data flow steps within a Video Preprocessor.

Data flow steps within the Video Preprocessor 120 are illustrated in FIG. 7. At step 710 Color Space Converter 122 receives 24-bit RGB video data and converts the data to a YST colorspace format. At step 720 the converted data is passed to Frame Activity Detector 126, which determines the level of frame-to-frame change in the data and stores and updates reference frames. At step 730, video data and frame activity information is passed to Subsampler 124, where each frame is subsampled, as described above. At step 740, the preprocessed video frame data is transmitted to Predictor 130. The Y channel is preprocessed, and in a preferred embodiment has 16 levels (4 bit), but is also dequantized, and the U&V are "stretched" 8 bit values. The data could be considered "processed 24-bit YST."

Figure 8:
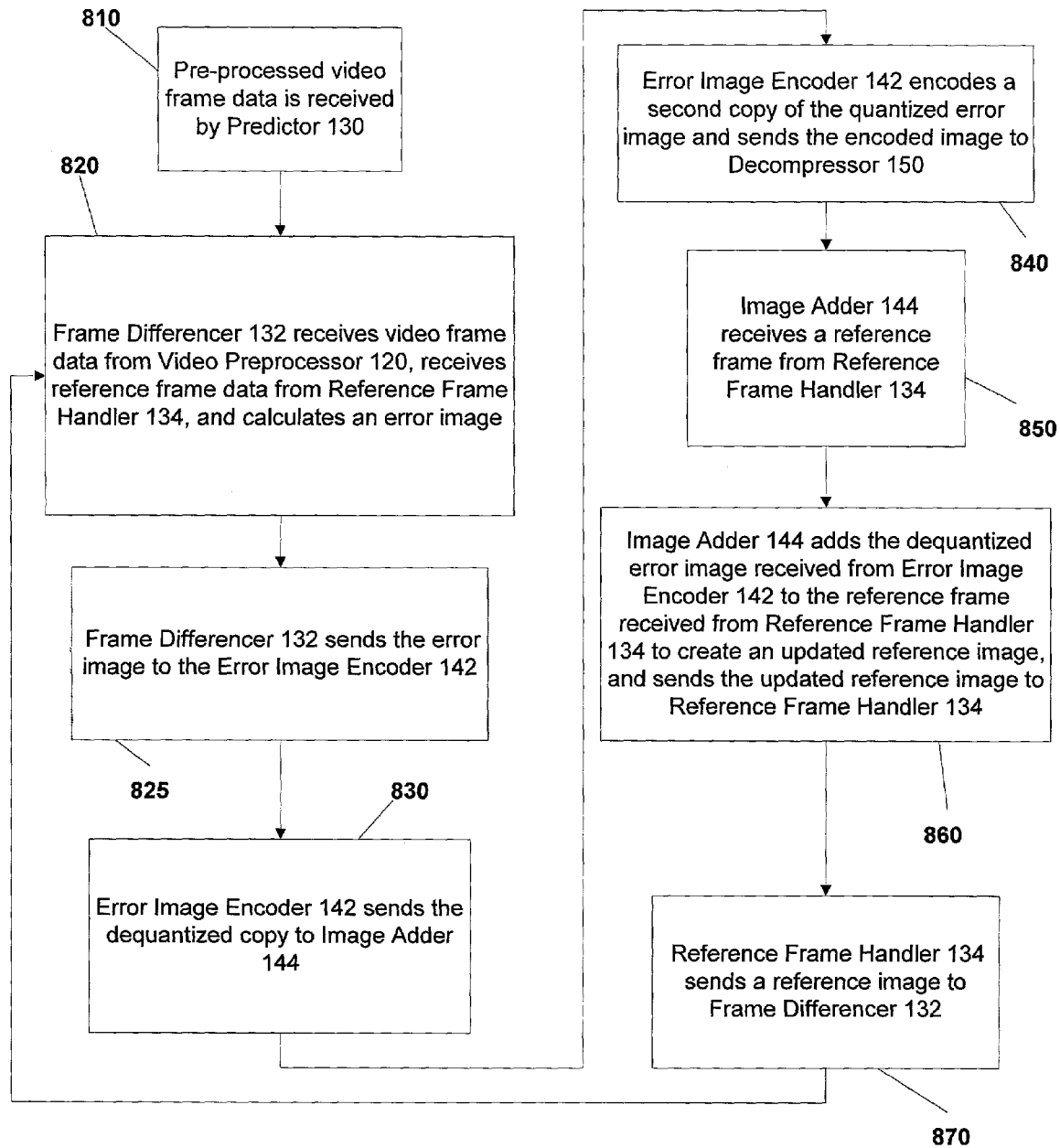
FIG. 8 depicts preferred data flow steps within a Predictor and Encoder.

Data flow steps within Predictor 130 and Encoder 140 are illustrated in FIG. 8. At step 810 pre-processed video frame data is received by Predictor 130. The Reference Frame Handler 134 receives the data and stores one (or two) reference frames, as described above, and send a reference frame to Frame Differencer 132. The Activity Detector 126 sends information as to whether interlaced/non-interlaced mode is to be used. When the encoder 140 receives this information, it also encodes it, and sends it to the decoder's Reference Frame Handler 164. At step 820, Frame Differencer 132 receives video frame data from Video Preprocessor 120, receives reference frame data from Reference Frame Handler 134, and calculates an error image, as described above. At step 825 Frame Differencer 132 sends the error image to the Error Image Encoder 142. Error Image Encoder 142 quantizes the error image, as described above, dequantizes one copy, and at step 830 sends the dequantized copy to Image Adder 144. At step 840, Error Image Encoder 142 encodes a second copy of the quantized error image, as described above, and sends the encoded image to Decompressor 150.

At step 850, Image Adder 144 receives a reference frame from Reference Frame Handler 134. At step 860, Image Adder 144 adds the dequantized error image received from Error Image Encoder 142 to the reference frame received from Reference Frame Handler 134 to create an updated reference image, and sends the updated reference image to Reference Frame Handler 134. At step 870, Reference Frame Handler 134 sends a reference image to Frame Differencer 132, and step 820 is repeated.

Figure 9:
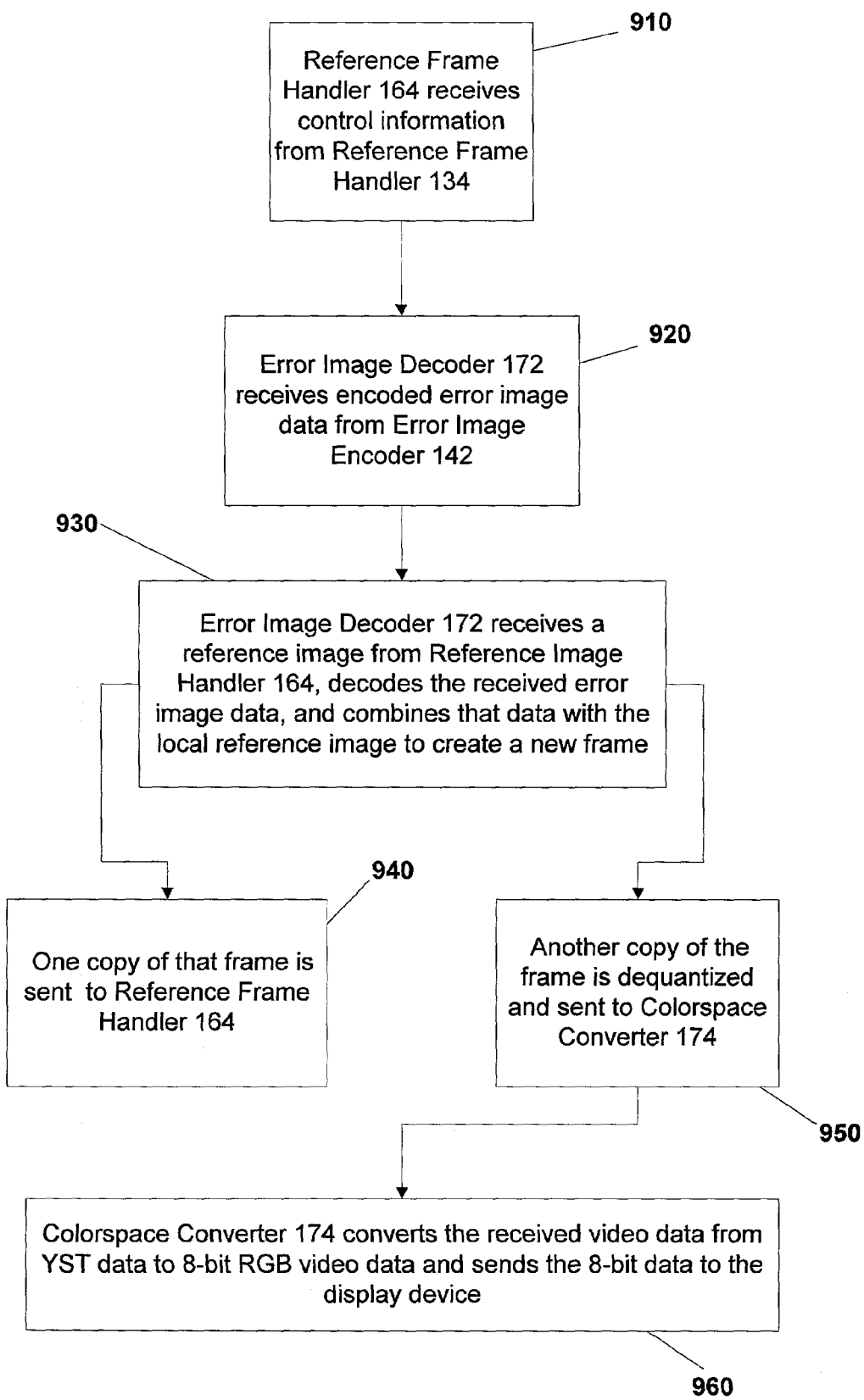
FIG. 9 depicts preferred data flow steps within a Decompressor.

Data flow steps within Decompressor 150 are illustrated in FIG. 9. At step 910 Reference Frame Handler 164 receives control information from Reference Frame Handler 134. At step 920 Error Image Decoder 172 receives encoded error image data from Error Image Encoder 142. At step 930 Error Image Decoder 172 receives a reference image from Reference Image Handler 164, decodes the received error image data, and combines that data with the local reference image to create a new frame. One copy of that frame is sent at step 940 to Reference Frame Handler 164, and another copy is dequantized and sent at step 950 to Colorspace Converter 174. At step 960 Colorspace Converter 174 converts the received video data from YST data to 8-bit RGB video data, while performing the tasks described above, and sends the 8-bit data to the display device.

Many of the methods used in the preferred embodiment provide a significant advantage in the wireless and mobile marketplace. This section describes the methods that provide this advantage.

To accomplish efficient, intelligent conversion to 8-bit color for display on mobile handsets, the preferred video codec uses table lookups to efficiently implement color conversion and dithering in a single step. The original video stream is subsampled, quantized, and color-converted to 12-bit YST color prior to transmission. At the decoder 150, the 12-bit YST is then converted to 8-bit RGB for display on the mobile handset.

To create the color conversion tables, each 12-bit YST color is matched to four 8-bit RGB pixels arranged in a 2×2 grid. The four RGB pixel values are chosen to give the best visual approximation to the original RGB color. The RGB approximations for all 4096 YST colors are stored in lookup tables so that no conversion computation needs to be done at the decoder 150—the correct RGB pixels are simply read from the table and written into the output image.

The color conversion tables of a preferred embodiment require 16 KB of storage space, which is a sensible tradeoff to save computational complexity in most mobile environments. In addition, the dithering effect achieved by choosing four 8-bit RGB colors to correspond to each 12-bit YST color provides good color quality at low computational cost. The standard prior art methods for converting from 12-bit color to 8-bit color are (1) straight quantization, which is fast but gives poor results, and (2) dithering, which gives much better results than straight quantization but at increased computational cost. The table lookup method of a preferred embodiment of the present invention provides the color quality of dithering with the computational efficiency of straight quantization.

The preferred video codec takes 24-bit RGB video as input and produces 8-bit (3:3:2) RGB video as output. However, it is important to note that the present invention encompasses and enables similar color conversion methods that could be applied to other input and output formats. For instance, the lookup tables could be rewritten to accommodate any 8-bit color scheme with no increase in size or complexity. The lookup table approach could also be used for conversion to output color schemes with more than 8 bits, with only moderate increase in the size of the lookup tables. For instance, if the output format required a 12-bit color, the table size would only need to be increased by 50%, to accommodate a 50% increase in output pixel size. However, if the number of bits in the intermediate 12-bit colorspace increases, the tables will double in size for every increase in the number of bits by one. For this reason, the preferred embodiment is preferred indeed for providing high-quality video on low-quality color displays such as those found on inexpensive and moderately-priced mobile devices.

Additional speed at the decoder 150 preferably is achieved in the video codec by combining upsampling and de-interlacing with the color conversion and dithering process. This combination allows all of these functions to be completed in a single pass through the image, saving both computational time and data memory (since no intermediate buffers are needed).

The YST video frames are subsampled compared to the output video size: the Y component is subsampled by a factor of 4 (2 in each dimension) and the S and T components are subsampled by a factor of 16 (4 in each dimension). This means that each S and T value corresponds to four Y values, and each of these Y values corresponds to 4 RGB values.

Figure 12:
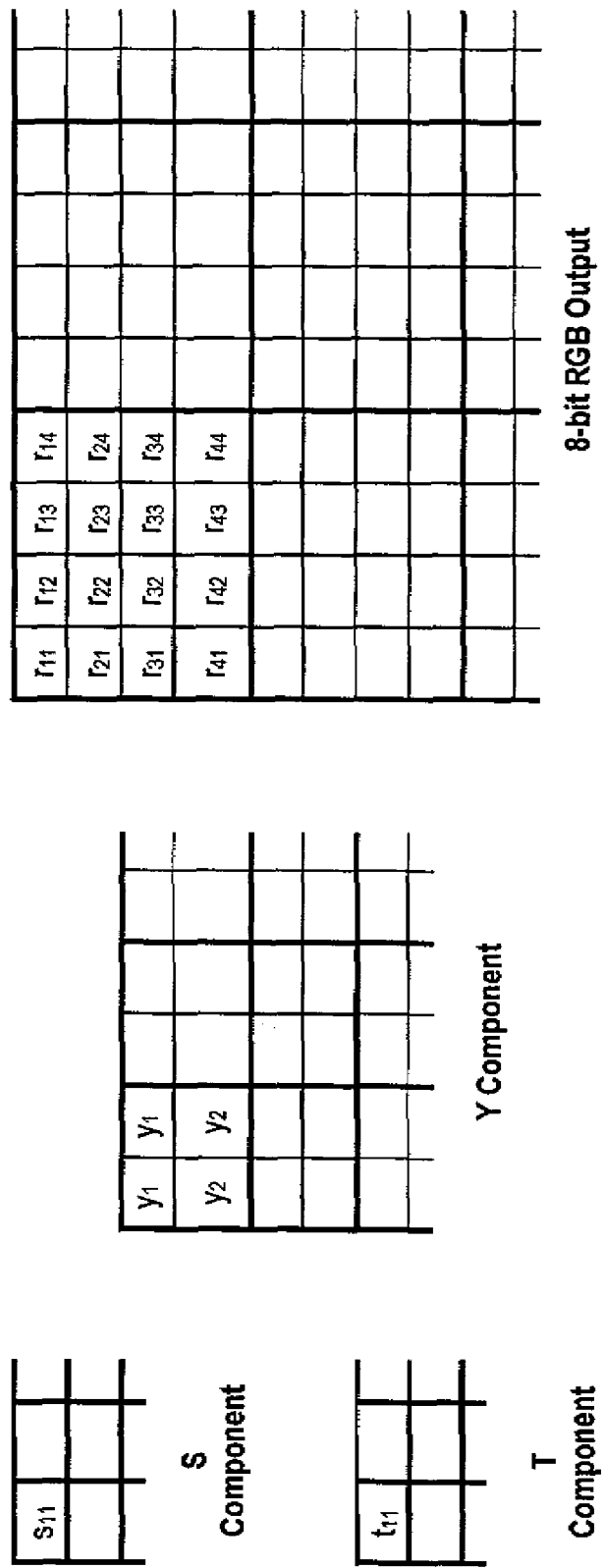
FIG. 12 illustrates one-pass color conversion, de-interlacing, and up-sampling.

This 4:1 correspondence between the Y component values and the output pixels makes the combination of upsampling with dithering straightforward. FIG. 12 shows the subsampling relationships between the YST component blocks and the output video frame. The S and T values $s_{11}$ and $t_{11}$ correspond to the four Y values $y_{11}$, $y_{12}$, $y_{21}$, and $y_{22}$. The S and T values are used four times to create four YST colors: $(y_{11}, s_{11}, t_{11})$, $(y_{12}, s_{11}, t_{11})$, $(y_{21}, s_{11}, t_{11})$, and $(y_{22}, s_{11}, t_{11})$. Each of these colors has an entry in the lookup table. A lookup on the color $(y_{11}, s_{11}, t_{11})$ provides the RGB values $r_{11}$, $r_{12}$, $r_{21}$, and $r_{22}$; a lookup on the color $(y_{12}, s_{11}, t_{11})$ provides the RGB values $r_{13}$, $r_{14}$, $r_{23}$, and $r_{24}$; etc.

De-interlacing preferably is combined into the same process by dividing the color lookup table into two tables—one for even rows and one for odd rows. When a video frame is interlaced, the lookup alternates between the two tables, reading two 8-bit RGB pixels for each YST color rather than four. On an even iteration in the example above, the RGB pixels $r_{11}$, $r_{12}$, $r_{13}$, $r_{14}$, $r_{31}$, $r_{32}$, $r_{33}$, and $r_{34}$ will be retrieved from the even lookup table and written to output. On an odd iteration, the pixels $r_{21}$, $r_{22}$, $r_{23}$, $r_{24}$, $r_{41}$, $r_{42}$, $r_{43}$, and $r_{44}$ will be retrieved from the odd lookup table and written. On non-interlaced frames, both tables are used so that all four RGB values for each YST color are retrieved.

In addition to the efficiency achieved by combining color conversion, upsampling, and de-interlacing into a single set of operations, the process preferably is made more efficient through the disclosed organization of the color tables and through the use of bit shifting and data types to reduce the number of pointer references and read/write operations. Since there are four Y values for each S and T value due to the preferred subsampling method, we have organized the table so that S and T only need to be considered ¼ as often as Y. "Bit-shifting and data types" refers to the way multiple pixels are treated simultaneously. Each output pixel value is an 8-bit value, but when read pixel values are read from the table they are read in pairs, treating each pair as a single 16-bit value. This cuts the number of read operations in half. Similarly, four pixels at a time are written by treating them as 32-bit values, cutting the number of write operations by ¼.

Those skilled in the art will recognize that some parts of the invention are not specific to use of the YST colorspace, and would enhance methods based the YUV colorspace or other colorspaces.

In the preferred video decoder 150, update information is immediately applied directly into the reference image buffer 162 as the encoded error stream is being decoded. This one-pass execution makes the decoder 150 efficient in both memory usage and processing power, since (a) single-pass execution reduces programming overhead associated with multiple passes through the data; (b) no intermediate buffer is needed to hold error information; and (c) only coefficients that change need to be updated—no computations are spent copying unchanged coefficients.

YST is a preferred colorspace designed to produce improved color quality on mobile and wireless devices with limited display and processing capabilities. By taking into account the color histogram properties of typical video clips and the color sensitivity of the human eye, the 12-bit YST color quantization is chosen to provide finer quantization in the color ranges that are most important in video quality perception. See below for a detailed description of the YST colorspace.

The video codec of a preferred embodiment accepts 24-bit color source video, but the displays on most mobile and wireless devices are not capable of displaying 24-bit color. Quantizing the video color down to the display color space (8-bit RGB, for example), is efficient from a compression standpoint but does not allow for fast dithering and results in poor color representation on the mobile device. However, sending full 24-bit color is inefficient in bandwidth, since a lot of information is transmitted and then ignored.

To balance the concerns of compression and video quality, the preferred video codec quantizes the color to 12 bits at the encoder 100 and then further quantizes from 12 bits down to 8 bits at the decoder 150. Transmitting 12-bit color allows the codec to use methods such as efficient dithering to provide good color representation on low-quality displays without requiring excessive use of transmission bandwidth. The use of 12-bit color and color dithering also allows video frames to be subsampled, since dithering can mask degradation in frame quality due to subsampling.

Activity detection and interlacing: In video sequences with a small amount of change between frames, interlacing can be used to improve the perceived quality of the video. The activity detection and interlacing process is described in detail in the "Video Preprocessor 120" section above. This interlacing method helps mask the quality degradation caused by subsampling, allowing the preferred codec to produce higher perceived quality while reaping the compression benefits of subsampling.

The "superthin-superfast" design of the preferred codec provides a significant competitive advantage. Providers of prior art codecs have begun with the assumption that certain standard methods such as transform-based compression and motion compensation must be included in order to fit within the bandwidth constraints of the wireless environment. However, the present invention takes a different approach, beginning with only the barest necessities for encoding and decoding video. By using intelligent subsampling, color quantization and conversion, and dithering methods, the present invention comprises a video codec that is computationally very simple but still provides enough compression to meet the bandwidth constraints of the wireless environment. Simplicity is a primary strength of the video codec, since low computational complexity allows the codec to run on a wide range of mobile devices, many of which lack the processing power to support prior art products.

The YST Colorspace

YST is a novel colorspace designed to produce improved color quality on mobile and wireless devices with limited display and processing capabilities. By taking into account the color histogram properties of typical video clips and the color sensitivity of the human eye, the 12-bit YST color quantization is chosen to provide finer quantization in the color ranges that are most important in video quality perception.

Figure 13:
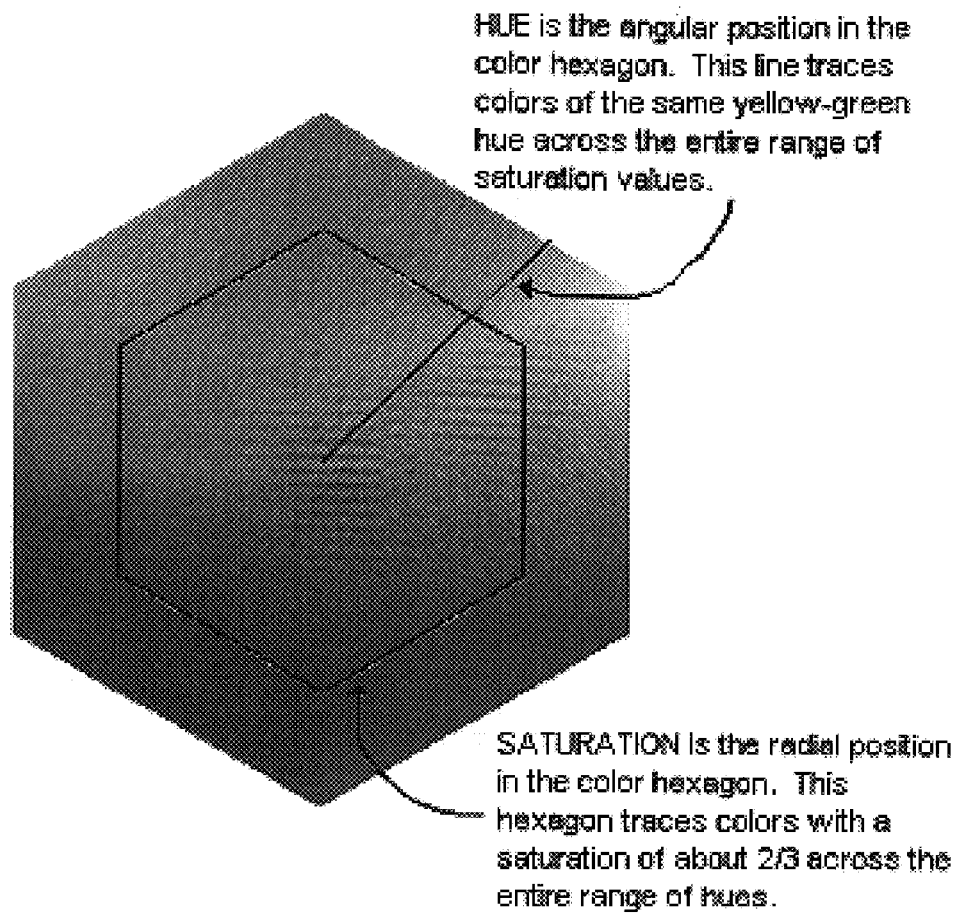
FIG. 13 depicts a color hexagon based on the HSV colorspace representation.

The color hexagon shown in FIG. 13 represents all colors that are displayable on an electronic display. All of these colors can be described in terms of three-element vectors. Examples of common descriptions are the RGB and HSV triples, which describe the amount of each one of these primary colors present in a particular display color. The hexagon chart shown in FIG. 13 is based on the HSV triple.

The H-component stands for "hue," which indicates the color frequency (or wavelength). The hue determines the angular position of a particular color in the color hexagon, so a radial line drawn from the center to the edge of the hexagon shows a set of colors with constant hue.

The S-component, for "saturation," indicates the purity of the color. Colors with low saturation appear "grayer" than colors with high saturation. The saturation determines the distance a particular color lies from the center of the hexagon, so concentric hexagons show sets of colors with approximately the same saturation. The center of the hexagon is true gray, where saturation is 0. The colors on the outside edge of the hexagon have full saturation.

The V-component of the HSV triple stands for "value." This term indicates the intensity or brightness of a particular color. Color intensity is not shown on the color hexagon, since the addition of a third component would require a three-dimensional representation. Instead, the color hexagon is a two-dimensional slice of the colorspace at a particular intensity. To visualize the three-dimensional colorspace, recall that the center of the color hexagon is true gray. The third dimension in the HSV colorspace runs along that gray axis, where the lowest intensity gray is true black, and the highest intensity gray is true white.

Other colorspaces, such as YIQ, YUV, and the novel YST colorspace used herein, can also be represented on a hexagon chart. In each of these colorspaces, the Y-component represents the intensity, corresponding to the V-component from the HSV colorspace. The other two components represent a coordinate mapping of the colors shown in the hexagon. The H- and S-components in HSV are radial coordinates in the hexagon. In YIQ and YUV, the I-Q coordinate pair and the U-V coordinate pair are rectangular coordinates in the hexagon, linearly transformed to meet the desired characteristics of the colorspace. The YST colorspace is designed somewhat similarly, with quantization points chosen to produce good quality color on low-quality displays with small computational cost.

The quantization pattern for the YST colorspace is chosen based on histogram characteristics of typical video clips and the color sensitivity of the human eye. The color chart in FIG. 14 shows an example of a YST quantization pattern.

Figure 14:
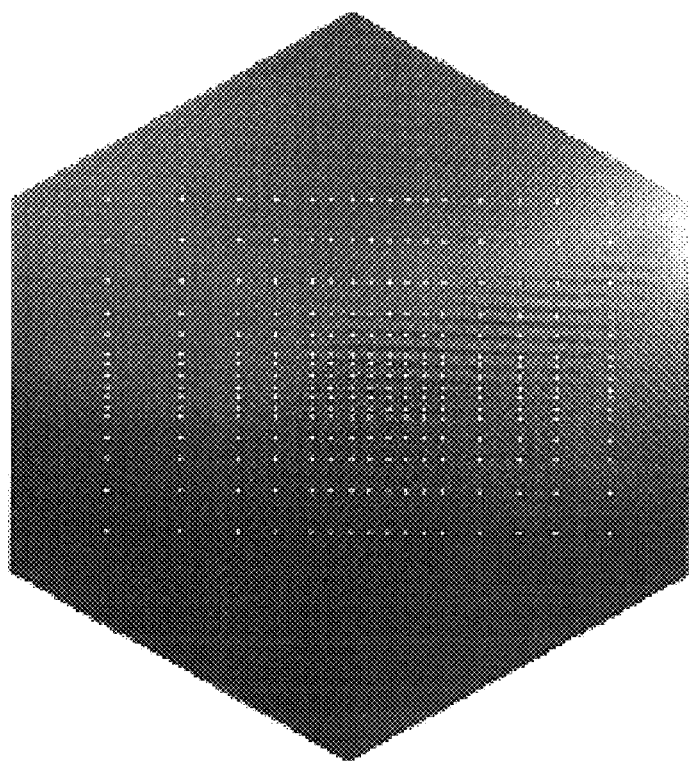
FIG. 14 depicts an exemplary YST quantization pattern for 12-bit color.

Following is a discussion of the goals and considerations resulting in the quantization characteristics shown in the pattern depicted in FIG. 14.

Figure 15:
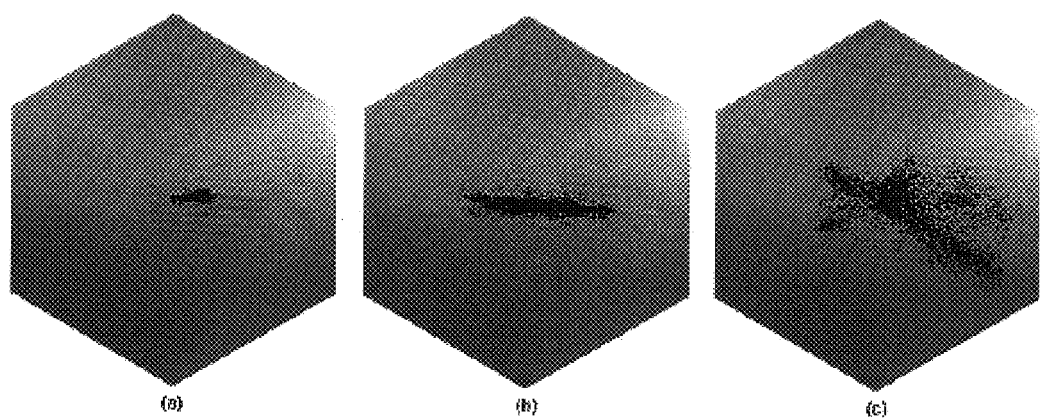
FIG. 15 depicts color histograms for video clips (a) susie.avi, (b) mummy.avi, and (c) elmo.avi.

Bandwidth Considerations: Color histograms for three different video clips are shown in FIG. 15. The histograms were drawn by choosing 10,000 pixels at random from the clips and mapping those pixels in the color hexagon. These examples show that there tends to be more variation in the blue-red direction than in the green-magenta direction for typical video clips. This histogram data could indicate that more bandwidth should be applied to the blue-red color information than to the green-magenta color information.

However, information on color perception of the human eye indicates that the eye is more sensitive to changes in green-magenta color information than in blue-red information. This sensitivity difference means that accuracy in the representation of green-magenta color components is more visually important than blue-red color accuracy. The need for accurate representation of green-magenta color information could indicate that more bandwidth should be applied to the green-magenta color information, contradicting the conclusion drawn from the histogram data.

The effect of the histogram data and perception information tend to cancel each other out, so that in designing the YST colorspace, the same bandwidth was allotted to the green-magenta and the blue-red color components. This translates into using the same number of quantization points in the green-magenta direction and the blue-red direction.

Sensitivity in Gray Color Ranges: The eye is more sensitive to color differences in the gray colors near the center of the color hexagon than to changes in the more saturated colors. For this reason, the quantization points in the YST colorspace are more closely spaced in the gray regions in the center of the color hexagon and more spread apart on the outer edges of the colorspace.

Range of Sensitivity: While the eye is more sensitive to changes in green-magenta shades than to changes in blue-red shades, the range of this sensitivity is more limited for green-magenta shades. For instance, the human eye perceives pure green at full saturation and at half saturation to be very nearly the same color. However, pure red at half saturation still appears noticeably "grayer" than full-saturation red. For this reason, the quantization points for the green-magenta colors are closer together and span a smaller range than the quantization points for the blue-red colors.

Shift to Emphasize Important Colors: A common artifact of color quantization is the loss of texture information. When colors are quantized, texture information resulting from small variations in color may be lost. In addition, gradual color changes may be replaced with bands of quantized color.

The eye is very sensitive to these kinds of quantization artifacts. Two common situations in which these artifacts arise are video sequences containing grass and trees, where texture appears as variations in natural greens, and video sequences containing human faces, where skin tones vary gradually depending on lighting. To improve color representation in these two common cases, the YST colorspace is shifted slightly toward green and red tones so that finer quantization is available for natural greens and skin tones.

In a preferred embodiment, RGB values are rescaled so that they take values in the range [0,1]. Then (Y,S,T) values are given by
Y=18R+36G+6B
S=18R−18B
T=−18R+36G−18B.

However, those skilled in the art will recognize that the specific coefficients used in the transformation do not have to be identical to those described above in order to be within the scope of the present invention. The invention encompasses the methods used to arrive at the transformation. Consequently, any transformation found using the above methods is part of the invention.

RGB can be calculated as the inverse of this matrix. However, in the preferred embodiment, a combined inverse and dither is used to create a greater number of perceived colors than is actually supported by the bit depth of the display. The inverse is used in the generation of color/upsample/dequantization look-up tables.

Y takes values in [0,60]; S takes values in [−18,18]; and T takes values in [−36,36]. Y is rounded off to the nearest of the 16 numbers: 0, 4, 8, 12, 16, 20, 24, 28, 32, 36, 40, 44, 48, 52, 56, and 60. Then S is rounded off to the nearest of the 16 numbers: −13, −9, 6, −4, −2, −1, 0, 1, 2, 3, 4, 5, 7, 9, 11, and 14. Then T is rounded of to the nearest of the 16 numbers: −14, −10, −7, −5, −3, −2, −1, 0, 1, 2, 3, 5, 7, 10, 14, and 18.

The quantization (rounding bins) is preferably determined by trial-and-error to produce the best visual quality for the characteristics of the specific display to be used. These characteristics include, among other possible factors, bit depth, resolution, and intensity ratio (similar to gamma).

In summary, a preferred embodiment comprises quantizing the colorspace in different regions and in different directions, in a manner matched to the information content and the human visual system; S and T establish the different directions.

The S component corresponds to the direction of largest amplitude of typical image and video data. The T component corresponds to the direction of smallest amplitude. See FIG. 15. Thus in some cases S may carry more information than T.

However, S also corresponds to the direction of least sensitivity of the human visual system and T to the direction of highest sensitivity. Thus both components typically carry roughly the same amount of information, as perceived by the human visual system (HVS). Thus roughly the same number of quantization levels can be used for S and T, but one should select the quantization levels for S and T in different ways.

The HVS is more sensitive for T than S, for small values of S and T. For large values of S and T the sensitivity drops. The region of high sensitivity is smaller for T than for S. Thus the quantization levels for both S and T should be denser near 0 and less dense away from 0. However, the levels for T should be significantly more clustered towards 0 than those for S. This can be seen in FIG. 14.

The above statements regarding amplitude can be demonstrated from the histograms. Subjective evaluations have shown that when the bandwidth of either direction is reduced, the perceived quality degrades, thus giving support to the claimed benefit of optimization for sensitivity and amplitude. Thus, the methods described herein provide a better set of directions over other popular color transforms, such as YUV and RGB.

It is believed that in the creation of other colorspaces these questions concerning the human visual system have not been asked or asked properly. Further, if they have been asked properly, they have not been under the constraints of computational, memory, and bandwidth efficiency.

It will be appreciated by those skilled in the art having the benefit of this disclosure that numerous variations from the foregoing preferred embodiments will be possible without departing from the inventive concept described herein. Accordingly, it is the claims set forth below, and not merely the foregoing illustrations, which are intended to define the exclusive rights of the invention.

What is claimed is:
1. A system for video decompression, comprising:
 a predictor; and
 a decoder configured to communicate with said predictor;
 wherein said predictor comprises a reference frame handler;
 wherein said decoder comprises an error image decoder and a colorspace converter, and performs color conversion and dequantization simultaneously; and
 wherein the decompression system is suitable for lightweight mobile phone-type environments and receives data that is compressed such that the decompression system requires reduced processing power.
2. A system as in claim 1 wherein said colorspace converter converts from YST to RGB.

* * * * *